CHARLES P. WHITMAN.
Improvement in Bench Dogs.
No. 118,662.  Patented Aug. 29, 1871.
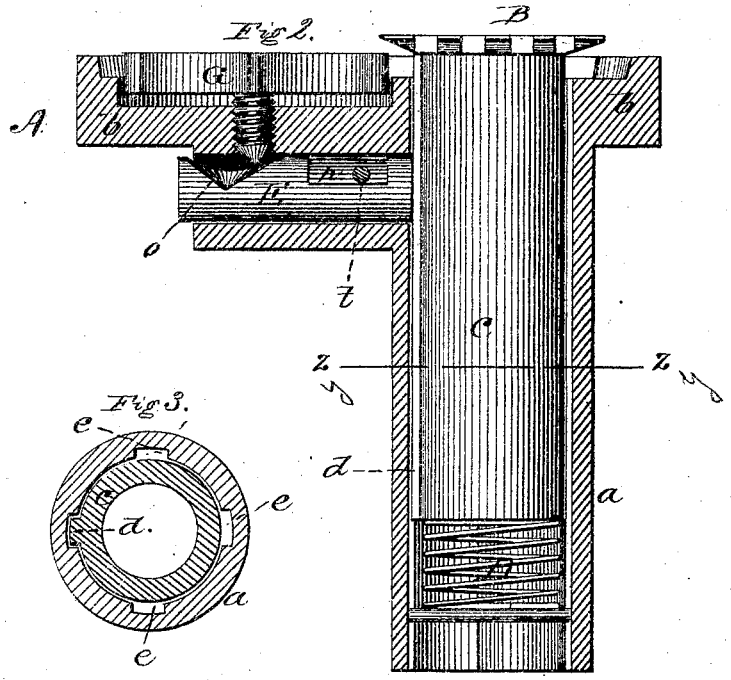

UNITED STATES PATENT OFFICE.

CHARLES P. WHITMAN, OF CHARLEMONT, MASSACHUSETTS.

IMPROVEMENT IN BENCH-DOGS.

Specification forming part of Letters Patent No. 118,662, dated August 29, 1871.

*To all whom it may concern:*

Be it known that I, CHARLES P. WHITMAN, of Charlemont, in the county of Franklin and State of Massachusetts, have invented certain Improvements in Bench-Dogs or Hooks, of which the following is a specification, reference being had to the accompanying drawing.

My invention relates to an improved bench-hook or dog for holding lumber while being planed; and the invention consists in a novel manner of constructing the dog, whereby it is rendered exceedingly cheap, simple, and easy of adjustment, and in providing it with several sets of teeth adapted for different uses, all as hereinafter more fully explained.

Figure 1 is a top-plan view of my dog. Fig. 2 is a vertical longitudinal section of the dog on the line $x$ $x$ of Fig. 1. Fig. 3 is a horizontal section on the line $y$ $y$ of Fig. 2.

A represents the body of the dog, cast in one piece and consisting of a vertical tubular neck, $a$, formed on the under side of a top plate, $b$, which latter has its upper side recessed, as shown in Fig. 2. B is the dog proper, having a round stem or shank, $c$, which slides in the neck $b$, and a flat square top plate, having teeth of different sizes on its four sides or edges, as shown in Figs. 1 and 2. The stem of the dog B is provided on one side with a rib, $d$, which slides in a groove, $e$, on the inside of the neck, so as to prevent the stem from turning, and thus to hold the upper toothed end in the desired position. The neck has four of the grooves $e$ on its inside at equal distances apart, and into either one of which the rib of the stem may be inserted. In this manner the dog B may be adjusted with either one of its upper sides foremost, according to the kind of teeth that are required for use. D is a spiral spring placed in the neck $a$ under the dog, to force the same up. E is a horizontal sliding bolt mounted in the under side of the top plate and bearing at one end against the shank of dog B, as shown in Fig. 2. In the top of the bolt E there is formed an inclined or V-shaped notch, $o$, and also a flat notch, $p$, through the latter of which a pin, $t$, passes to prevent the bolt from sliding out of its seat. G is a thumb-screw inserted through the top-plate $b$ and bearing at its lower end upon one of the inclined sides of the notch $o$ in the bolt, as shown in Fig. 2, so that, by screwing down the thumb-screw, its lower end, bearing on the incline, will force the bolt E up against the shank of dog B, and thus prevent the latter from moving. When the thumb-screw is turned upward its lower end rises from the incline and the bolt slides back and releases the dog, which is immediately pushed up by the spring D.

In using the device the screw is turned up so as to release the dog, the dog then removed and inserted with those teeth forward which are adapted to the work in hand. The dog is then pushed down until the teeth are at the proper height, and fastened by turning the thumb-screw.

Instead of making the neck $a$ and the shank of the dog round and providing them with the grooves and rib, the same object may be accomplished by making the neck and shank triangular, square, or octagonal, so that the shank can be inserted either side first, the head being in such cases provided with the same number of toothed sides or edges as there are sides to the shank.

By the above-described method of construction I produce a very light, simple, and strong bench-dog, which can be readily adjusted and which is adapted for various kinds of work.

Having described my invention, what I claim is—

The herein-described bench-hook, consisting of the body A, reversible dog B with the bolt E having the inclined recess, and the pointed screw G, all constructed and arranged to operate as set forth.

CHARLES P. WHITMAN.

Witnesses:
AUSTIN DRAKE,
H. M. PUFFER.